Feb. 10, 1925.
B. E. DOWNTON
1,526,269
AUTOMATIC WATER TRAP
Filed May 25, 1922    2 Sheets-Sheet 2
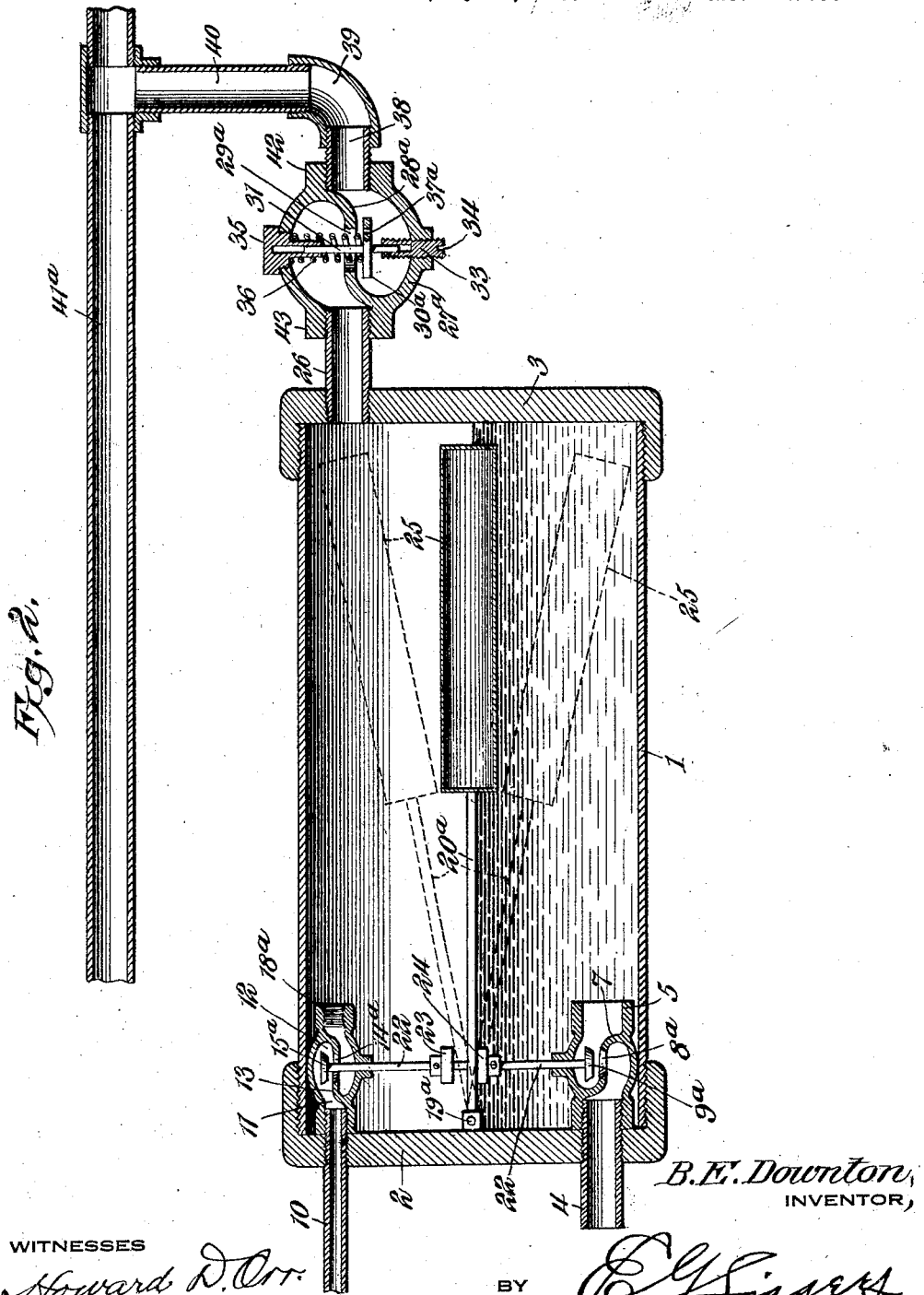

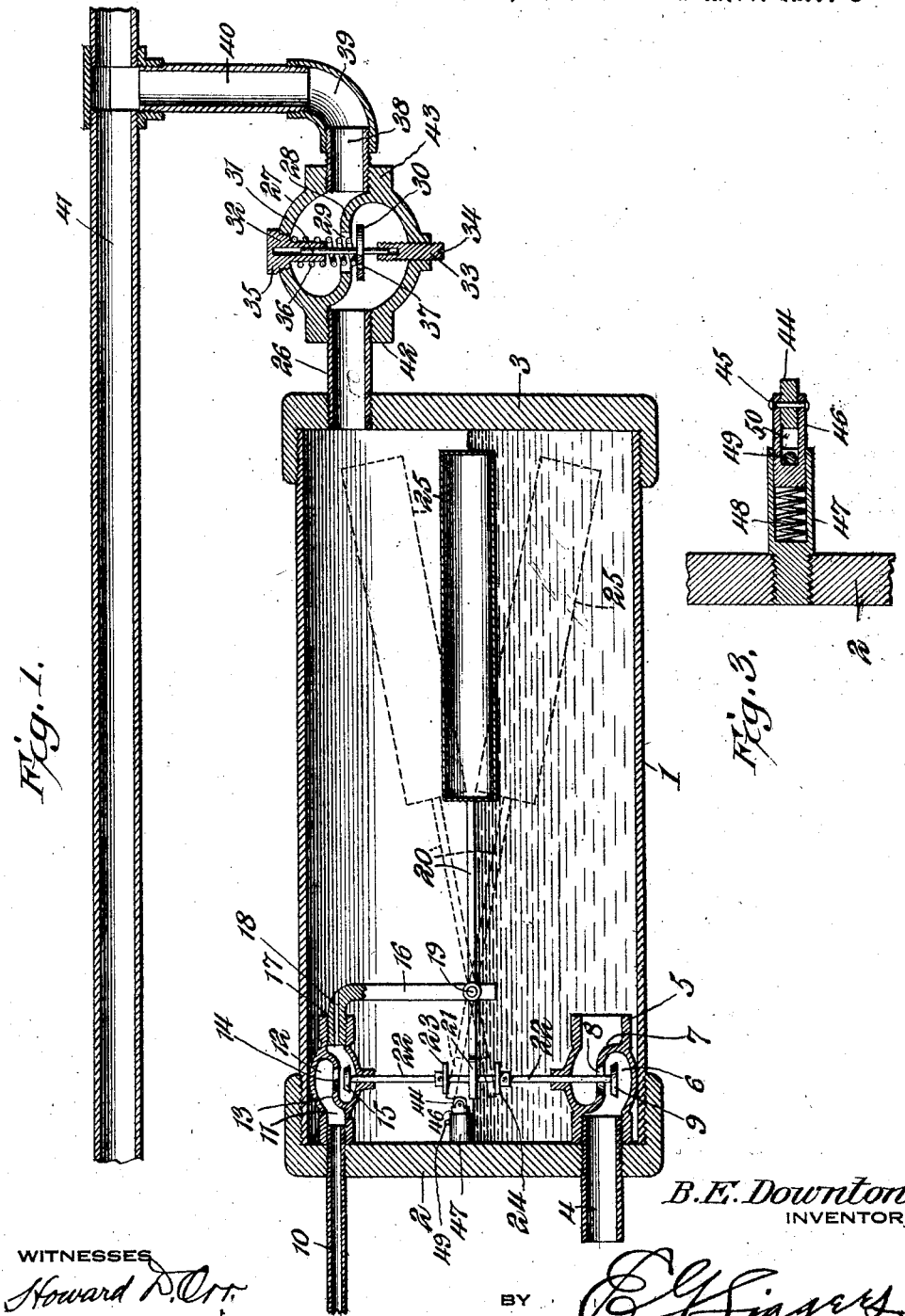

Patented Feb. 10, 1925.

1,526,269

UNITED STATES PATENT OFFICE.

BERTRAM E. DOWNTON, OF DEWEY, OKLAHOMA, ASSIGNOR OF ONE-HALF TO D. O. RALSTON, OF DEWEY, OKLAHOMA.

AUTOMATIC WATER TRAP.

Application filed May 25, 1922. Serial No. 563,585.

*To all whom it may concern:*

Be it known that I, BERTRAM E. DOWNTON, a citizen of the United States, residing at Dewey, in the county of Washington and State of Oklahoma, have invented a new and useful Automatic Water Trap, of which the following is a specification.

This invention relates to traps adapted to be positioned in low places in gas lines leading from the casing head of oil wells.

Water and gasoline condenses and accumulates in the gas lines from the casing head of oil wells, and is eventually drawn or forced into the gasoline plant, thereby causing trouble in the operation of the plant and interfering with production.

In drawing gas from a well by suction, a partial vacuum is developed in the casing surrounding the oil tubing to about 26 inches. The suction created necessarily draws oil through the sand to the bottom of the tubing and increases the oil production of the well, the gas coming up through the casing which encloses the oil tubing and passing out through a separate pipe to the gasoline plant. The gas lines in low places collect considerable water, which, if not disposed of, causes the vacuum to drop at the wells, thereby decreasing production both of oil and gasoline. Furthermore, when water is agitated, due to a vacuum, air is given off, which is very troublesome to gas engine operation, and likewise decreases the production of gasoline.

If a positive pressure is used in the gas lines, water in said lines, unless eliminated, is forced along in the gas lines to the gasoline plant.

Manually operated traps usually placed in such lines are visited daily and drained by an employee, but frequently these lines accumulate water faster than the employee can release the same from the traps, and consequently water passes along the lines to the plant.

It is an object of my invention to install an automatically operated trap in the gas line which will collect water from the gas line and discharge as rapidly as the trap fills, and which will at all times keep the lines free from water and maintain a substantially constant negative or positive pressure at the wells.

To this end, I have constructed a special form of water inlet valve between the trap and the gas line which is caused to be automatically operated by pressure or the absence of pressure in the casing head gas line, and the level of the water in the trap chamber. When the water inlet valve is closed, pressure, either positive or negative, in the gas line will react against the atmospheric pressure in the trap chamber until the pressure in the trap chamber becomes substantially equal to the pressure in the gas line, when the valve will automatically open and permit water to flow into said trap chamber. After a certain level of water is reached in the trap chamber, water is automatically discharged and air is admitted, providing an atmospheric pressure in the trap chamber and thus destroying the equality of pressures upon opposite sides of the water inlet valve, whereby the water inlet valve is closed to stop the flow of water from the gas lines to the trap chamber. The same form of valve just described may be employed in the gas lines which will automatically close the gas lines in case a leakage occurs in said lines.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is a longitudinal section of an automatic trap which operates by a vacuum maintained in the gas line pipe.

Fig. 2 is a longitudinal section of a modified form of automatic trap which is operated by a positive pressure in the gas lines.

Fig. 3 is a horizontal section showing a detail of the retarding means for the float.

In constructing the trap disclosed in both forms, I preferably, though not necessarily, use a certain length of standard 8-inch pipe to form the trap chamber 1, which is externally threaded at its ends and provided with caps 2 and 3, respectively screwed on the ends of the pipe.

The lower end of the cap 2 is provided with an internally threaded perforation, into which is screwed a pipe connection 4, having its outer end open to the atmosphere and its inner threaded end projecting within the trap chamber 1. Upon this projecting inner end there is screwed a valve body 5, having a valve chamber 6 with a partition 7 therein. In Fig. 1, the partition is provided with a port 8 controlled by a water outlet valve 9 adapted to be moved upwardly to close said port.

At the upper end of the cap 2 is provided an internally threaded perforation, into which is screwed a pipe 10 forming an air inlet to the chamber 1. The inner threaded end of the pipe 10 projects inwardly into said chamber, and is engaged by the internally threaded portion of a tubular extension of the valve body 11 having a valve chamber 12. A partition 13 is located in the valve body and is provided with a port 14 controlled by an air inlet valve 15 adapted to be moved upwardly to close said port.

A bent arm 16 having a horizontal screw-threaded portion 17 is screwed into the internally threaded inner end of the valve body, and has an air passage 18 connecting the valve chamber 12 with the trap chamber 1.

The downwardly-depending portion of the arm 16 is provided with a pivot pin 19, upon which is mounted intermediate of its ends, a float arm 20. The outer end 21 of the arm 20 is enlarged and perforated and slidable on a valve rod 22, which is connected at its opposite ends respectively to the valves 9 and 15. Stops 23 and 24 are mounted on the valve rod 22 upon opposite sides of the enlargement 21 of the arm 20, and are adapted to be engaged by said enlargement at different times for shifting the rod and thereby operating the valves connected to said rod.

The inner end of the arm 20 is connected to a float 25, which is adapted to be raised or lowered by the level of the water flowing into the trap chamber 1 through a pipe 26 mounted in an opening in the cap 3 which forms a closure for the other end of the trap chamber 1.

Upon the outer screw-threaded end of the water inlet pipe 26 is mounted the reduced end 42 of a valve chamber 27.

The valve chamber 27 is provided with a partition 28 having a port 29, which is adapted to be controlled by a valve disk 30, mounted on a rod 31 slidable in vertical bearings 32 and 33, respectively. The bearing 32 has a screw-threaded portion, adapted to engage an internally threaded perforation formed centrally of and at the top of the valve chamber 27, while the bearing 33 is mounted in a screw-threaded perforation at the bottom of the valve chamber 27 and diametrically opposite the bearing 32. The bearing 33 is provided with a slot 34 adapted to be engaged by a suitable tool for turning the bearing 33, whereby said bearing may be adjusted towards or away from the end of the slidable valve stem 31.

The head 35 of the bearing 32 may be of any polygonal shape whereby the same may be engaged by a suitable tool for turning said bearing, either for removal or for adjusting the tension of a coiled spring 36, through the upper end of which is inserted the lower end of the bearing 32. The coiled spring 36 is adapted to maintain a downward pressure on the disk 30 to open the valve at certain times. The spring with screw adjustment permits the valve to operate at any desired drop in the vacuum in the well.

The valve disk 30 is provided with a perforation 37 to permit air from the trap chamber 1, to pass through the valve chamber 27 and through the connections 38, 39 and 40, which lead to the casing head gas line 41. The connection 38 is mounted in one of the reduced ends 43 of the valve chamber 27.

The casing head gas line 41 is under a vacuum of 26 inches normally when oil is being pumped from the well, and therefore this degree of negative pressure is extended to the trap chamber 1 at certain times in the operation of the trap for collecting water.

The valve 30, with its chamber, is of special construction and has the capacity of a 3-inch valve internally, with the reduced portions of the valve chamber, which are connected to the tubes 26 and 38, forming a 2-inch connection. This permits the valve 30 to have a shorter working stroke, thereby making it more sensitive and providing for finer adjustments while still maintaining the equivalent of a 2-inch system.

In order to prevent prolonged draining of the water from the trap chamber 1, and at the same time to cause a sudden closing of air and water outlet valves 15 and 9, respectively, I employ a device to retard the movement of the end 21 of the float arm 20 when the float 25 is descending.

The retarding device comprises a roller 44 located in the path of the end 21 of the float arm and adapted to engage said end when the float is in its lower position and the end 21 is about to engage the upper stop 23.

The roller 44 is rotatable on a pin 45 mounted in a bearing 46 slidable in a hollow stud forming a socket 47 which has one end screwed into a threaded opening in the cap or cover 2 of the trap chamber 1. The inner end of the bearing 46 abuts one end of a coil spring 48 seated within the hollow stud 47. The spring forces the bearing 46 and the wheel 44 outwardly of the socket so that said wheel will always be in a position to engage the end 21 of the float arm 20.

A cotter pin 49 is inserted through alined perforations in the hollow stud 47, whereby said pin is maintained in position. The pin passes through a slot 50 of the bearing 46 in which the wheel 44 revolves, said pin being located between the periphery of the wheel and the inner end of said slot whereby the pin will permit the bearing to slide within the socket 47 of the hollow stud but prevent the bearing from being lost from said stud.

As the float is lowered and the end 21 of the arm 20 is elevated, the end 21 will engage the roller 44 and retard the descent of the float. Since the weight of the float is greater in proportion to the force of the spring 48 acting on the roller 44, the end 21 of the float arm will be eventually forced past the roller when the float will drop causing the end 21 of the float arm to strike stop 23 and thereby suddenly close valves 9 and 15, which are operated through the movements of stops 23 and 24 and rod 22.

The operation of my device, illustrated by Fig. 1, is as follows:—

As shown in Fig. 1, the valve 30 is about to be closed due to the difference of pressure upon opposite sides of said valve, since a vacuum exists in the gas line 41, while substantially atmospheric pressure exists in the trap chamber 1. This is created in the trap chamber when air is admitted to the said chamber through tube 10 and passage 18, and the air valve 15 has been opened by the position of the float 25.

As the valves 9 and 15 are connected to the same rod 22 and thereby operated simultaneously by the float 25, valve 9 will be opened with valve 15 to permit water to be discharged from the trap chamber through the tube 4.

When the valve 30 closes by the difference in pressures upon opposite sides of said valve, a slight quantity of air is being drawn from the trap chamber constantly through the perforation 37 in the water inlet valve 30.

The discharge of the water from the trap chamber lowers the float 25 until a predetermined level will have been reached, when the enlargement 21 of the arm 20 engages with the stop 23, thereby elevating the rod 22 and closing the air valve 15, and the water discharge valve 9. At this time, neither water from the gas line 41, nor air from the tube 10, is admitted to the trap chamber since these valves are closed, but air is being exhausted from the trap chamber 1 through the perforation 37 of the valve 30 because of the vacuum in the gas line 41.

When the air in the trap chamber has been sufficiently exhausted to cause the negative pressure on both sides of the water inlet valve 30 to be substantially equal or nearly so, the tension of the spring 36 will overcome the negative pressure from the gas line 41, and open valve 30 whereby water from the gas line will be admitted through pipe 26 to the trap chamber 1.

When sufficient water has been admitted to the trap chamber 1 to elevate the float 25 to the upper position shown in dotted lines, the enlargement 21 on the arm 20 will act upon the stop 24, lowering rod 22, and likewise opening valves 15 and 9. Water is discharged from the trap chamber through tube 4, while air is admitted through the tube 10 to said trap chamber, and valve 30 at this time will close.

The admission of air to the trap chamber 1 will cause an unequal pressure on opposite sides of the valve 30, and due to the suction in the gas line 41, the water inlet valve 30 will be closed, except for the perforation 37 through which air will be drawn from the trap chamber 1.

These conditions of operation just described for the different elements comprising the trap chamber will be continuous, and the discharge of the water from the trap chamber and the admission of the water from the gas line to the trap chamber will be automatic and will require no daily manual operation by an employee.

The spacing of the stops 23 and 24 on the valve rod 22 is such that a certain predetermined time is permitted to elapse between the opening and the closing of the valves 9 and 15 for an efficient working of the trap, so that at no time during the operation of the trap will the float act too rapidly and thereby prevent the valve 30 from remaining open for a sufficient period of time, or the fluttering of valves 9 and 15.

This valve may also be used in the vacuum line from each well, where should a hole develop in the casing, the vacuum in the well will be necessarily reduced, thereby setting up a current through the valve which will cause it to close, thus isolating the defective well from the system.

In the modification disclosed by Fig. 2, the trap chamber 1, water outlet pipe 4, tube 10 which connects the trap chamber with the atmosphere, valve bodies 5 and 11, and float 25 are similar to the respective elements shown in Fig. 1. Since a positive pressure is maintained at times, within the trap chamber of Fig. 2, by the gas under pressure from line 41$^a$, the valve 15$^a$ with its seat 14$^a$ and the water outlet valve 9$^a$ with its seat 8$^a$ are in reverse order relative to the corresponding valve and seats of Fig. 1. Valves 9$^a$ and 15$^a$ are connected by the stem 22 which is provided with stops 23 and 24 engageable with an oscillating arm 20$^a$ connected to the float 25.

The valves 9$^a$ and 15$^a$, shown in Fig. 2, are placed above their respective seats 8$^a$ and 14$^a$ instead of below, as disclosed by Fig. 1, so that said valves must be moved downwardly instead of upwardly to close their respective ports by the arm 20ᵃ; therefore the end of said arm is pivoted at 19ᵃ to the cover 2 instead of at a point intermediate its ends on the bracket 16 of Fig. 1, and the stops 23 and 23 are engaged at a point intermediate the ends instead by the end of the oscillating arm, as previously described.

Since the bracket 16 has been eliminated from the trap chamber of Fig. 2, gas under pressure from the trap chamber escapes through passage 18ᵃ through port 14ᵃ and out through the tube 10 until atmospheric pressure is established within the trap chamber 1.

The connections between the gas line 41ᵃ, which is maintained under a positive pressure in place of a vacuum, and the trap chamber 1, are similarly constructed. The water inlet valve body 27ᵃ of Fig. 2 is identical in structure with the valve body 27 of Fig. 1; nevertheless the reduced ends 42 and 43 are connected in reverse order to the pipe connections 26 and 38, respectively, so that the reduced end 43 of the valve body is connected to pipe 26 while the reduced end 42 is connected to pipe 38. This change of position of the valve body 27ᵃ reverses the position of the diaphragm or portion 29ᵃ so that the tube 38 opens into the lower chamber of said valve body instead of opening into the upper chamber of the valve body, as disclosed in Fig. 1.

In Fig. 1, the vacuum from the gas line 41 acts upon the upper face of valve 30 while pressure in the gas line 41ᵃ of Fig. 2 acts upon the lower face of valve 30ᵃ, so that in the first form when valve 30 is closed, the vacuum in gas line 41 will exhaust air from the trap chamber 1 through perforation 37 in said valve, while pressure in gas line 41ᵃ will force gas through perforation 37ᵃ in valve 30ᵃ, to increase the pressure in the trap chamber.

The operation of the modified form of the trap disclosed in Fig. 2 is as follows:—

The float 25 is shown descending with the water outlet valve 9ᵃ and the gas outlet valve 15ᵃ open, and the trap chamber discharging both water and gas under pressure. When the float 25 has been sufficiently lowered, the arm 20ᵃ by its engagement with the stop 24 will close both valves. Due to the difference in pressure between the gas line 41ᵃ and the trap chamber 1, valve 30ᵃ will close, but since gas under pressure passes through perforation 37ᵃ in valve 30ᵃ, the pressure in trap chamber will rise until it becomes substantially equal to the pressure in gas line 41ᵃ, when spring 21 will open said valve and permit water from the gas line to flow into the trap chamber.

When the incoming water in the trap chamber has sufficiently elevated the float 25 to raise valves 9ᵃ and 15ᵃ, water and gas will again be discharged to lower float 25 and reduce the pressure in the trap chamber, whereby valve 30ᵃ will close until the pressure of the gas in the trap chamber admitted through perforation 37ᵃ is substantially equal to the pressure in line 41ᵃ.

It will be seen that no matter whether a negative or positive pressure is maintained in the gas lines 41 or 41ᵃ, the operation and function of valves 9, 15, 30 and valves 9ᵃ, 15ᵃ and 30ᵃ, will be identical and produce the same results.

In Fig. 1, the air inlet valve 15 is shown smaller than the water outlet valve 9, and when a vacuum is had in the trap chamber 1, valve 15 will tend to open, while valve 9 will tend to close under suction. Due to the difference of the exposed areas of the valves 9 and 15 to the action of the vacuum in the trap chamber, the valves will be closed very readily by a small float against a high vacuum in said chamber, since the greater force acting to close valve 9 will overcome the force acting to open valve 15.

In Fig. 2, the gas valve 15ᵃ has a smaller surface area acted upon by the positive pressure in the trap chamber 1 than the water outlet valve 9ᵃ, and therefore due to the differential action between these two valves, a small float only will be required to close said valves.

The positive pressure acting on valve 15ᵃ to open the same will be overcome by the weight of the float and the greater pressure acting on valve 9ᵃ to close said valve, whereby valves 9ᵃ and 15ᵃ will be closed.

What is claimed is:—

1. In a device of the character described, the combination with a gas line, of a trap chamber at a lower level than the gas line, a branch passage leading downwardly from the gas line to the trap chamber and adapted to deliver water to said chamber from the gas line, a float in said chamber, a valve controlled water discharge passage leading from the trap to a region of atmospheric pressure, a valve controlled air inlet passage leading from the atmosphere and opening into the upper part of the chamber, both controlling valves being connected in operative relation with the float for simultaneous movement, a water inlet valve in said branch passage and automatically operable by a difference of pressure between the trap chamber and the gas line, and means tending to gradually equalize the pressure in the gas line and the trap chamber when the inlet valve is closed.

2. A water trap for gas lines connected to an oil well casing head, comprising a trap chamber, a water inlet adapted to deliver water to the chamber from the gas lines, a float in said chamber, a water discharge valve and a valve for controlling communication between the chamber and the atmosphere, connected to the float for simultaneous movement, a water inlet valve connected to the water inlet and adapted to be closed by a difference of pressure between the gas lines and trap chamber, and a perforation in the water inlet valve for equalizing the pressures in the trap chamber and gas lines when said valve is closed whereby said valve may be opened.

3. A water trap for gas lines connected to an oil well casing head, comprising a trap chamber, a water inlet adapted to deliver water to the chamber from the gas lines, a float in said chamber, a water discharge valve and a valve for controlling communication between the chamber and the atmosphere, connected to the float for simultaneous movement, a water inlet valve connected to the water inlet and adapted to be operated by a difference in pressures between the gas lines and the trap chamber, a perforation in the water inlet valve for equalizing the pressures in the gas lines and the trap chamber when said valve is closed, and a spring for opening said valve when said pressures have been equalized to allow the water to pass into the trap chamber.

4. A water trap for gas lines connected to an oil well casing head, comprising a trap chamber, a water inlet adapted to deliver water to said chamber from the gas lines, a float in said chamber, a water discharge outlet and a valve for same connected to the float for simultaneous movement, a water inlet valve connected to the water inlet and adapted to be operated by a difference in pressures between the gas lines and the trap chamber, and means connecting the gas lines with the trap chamber when the water inlet valve is closed for equalizing the pressures in the trap chamber and gas lines.

5. A water trap for gas lines connected to an oil well casing head, comprising a trap chamber, a water inlet adapted to deliver water to said chamber from the gas lines, a float in said chamber, a water discharge outlet and a valve for same connected to the float for simultaneous movement, a water inlet valve connected to the water inlet and operated by a difference in pressure between the gas lines and the trap chamber, a spring for said inlet valve, and means connecting the gas lines with the trap chamber through the water inlet valve when the latter is closed for modifying the pressure in the trap chamber, said water inlet valve being automatically opened by said spring, when the pressure is nearly equal upon both sides of said valve.

6. A water trap for gas lines connected to an oil well casing head, comprising a trap chamber, a water inlet adapted to deliver water to said chamber from the gas lines, a float in said chamber, a water discharge valve and an air inlet valve for said chamber connected to the float for simultaneous movement, a water inlet valve connected to the water inlet and operated by the vacuum in the gas lines, means connecting the trap chamber with the gas lines through the water inlet valve whereby the air in the trap chamber is exhausted, and means for positively opening the water inlet valve when the vacuum in the trap chamber is nearly equal to the vacuum in the gas lines.

7. A water trap for gas lines connected to an oil well casing head, comprising a trap chamber, a water inlet adapted to deliver water to the chamber from the gas line, a float in said chamber, a water discharge valve and an air inlet valve both communicating with a region of atmospheric pressure and connected in operative relation with the float for simultaneous movement, a water inlet valve associated with the water inlet and operated by the difference in pressure between the gas line and the trap chamber, and a bleed port between the gas line and the trap chamber to gradually equalize the pressure when the inlet valve is closed.

8. A water trap for gas lines connected to an oil well casing head, comprising a trap chamber, a water inlet adapted to deliver water to the chamber from the gas line, a float in said chamber, an air inlet passage leading from the atmosphere to the upper part of the chamber, a water discharge passage leading from the lower part of the chamber to a region of atmospheric pressure, valves for the air inlet passage and water discharge passage, both arranged in operative relation to the float to be actuated simultaneously thereby, a valve associated with the water inlet and operated by a difference in pressure between the gas line and the trap chamber, a bleed port between the gas line and the trap chamber to gradually equalize the pressure when the inlet valve is closed, and means for varying the extent of movement of said water inlet valve.

9. A water trap for gas lines connected to an oil well casing head, comprising a trap chamber adapted to receive water from the gas line, a valve controlled water outlet located at a low level in the chamber and leading to a region of atmospheric pressure, a valve controlled water inlet adapted to admit water from the gas line to the chamber at a higher level than the water outlet, a valve controlled outlet passage at a high level in the chamber and adapted to supply air at atmospheric pressure to said chamber, a float in the chamber for positively and simultaneously opening or closing the air inlet valve and the water outlet valve, and spring means for opening the water inlet valve independently of the other valves when the pressure in the gas line is nearly equal to the pressure in the trap chamber.

10. A water trap for gas lines connected to an oil well casing head, comprising a trap chamber adapted to receive water from the gas lines, a valve controlled water outlet located at a low level in the chamber, a valve controlled water inlet at a higher level than the water outlet, a valve controlled and restricted air inlet at a high level in the chamber, a rod carrying the air inlet valve and the water outlet valve, a bracket, and a float having an arm pivoted intermediate its ends on the bracket, the free end of the arm engaging stops on said rod for positively operating said valves to open or closed position.

11. A water trap for gas lines connected to an oil well casing head, comprising a trap chamber adapted to receive water from the gas lines, a valve controlled water outlet located at a low level in the chamber, a valve controlled water inlet at a higher level than the water outlet, a valve controlled and restricted air inlet at a high level in the chamber, a rod connecting the air inlet valve and the water outlet valve, a bracket, and a float having an arm pivoted intermediate its ends on the bracket, the free end of the arm engaging stops on said rod for positively operating said valves to open or closed position, and an air passage leading from the air inlet to the trap chamber.

12. A water trap for gas lines connected to an oil well casing head, comprising a trap chamber adapted to receive water from the gas lines, a valve controlled water outlet located at a low level in the chamber, a valve controlled water inlet at a higher level than the water outlet, the valve of said water inlet being provided with a perforation, a spring for said valve, a valve controlled air passage at a high level in the chamber, and a float in the chamber for positively and simultaneously opening and closing the air inlet valve and the water outlet valve, said float being operated by the rise and fall of the water in the chamber discharged thereinto through the water inlet.

13. A water trap for gas lines connected to an oil well casing head, comprising a trap chamber, a water inlet adapted to deliver water to said chamber from the gas lines, a float in said chamber provided with an arm pivotally connected with a fixed part of the trap chamber, a water discharge valve and an air valve for the chamber, connected in operative relation with the float arm for simultaneous movement, a water inlet valve connected to the water inlet and automatically operable by a difference of pressure between the trap chamber and the gas lines, and means engaging said arm to retard the downward movement of the float and thereby prevent a too rapid draining of the water from the float chamber.

14. A water trap for gas lines connected to an oil well casing head, comprising a trap chamber adapted to receive water from the gas lines, a valve controlled connection between the gas lines and the trap chamber, an air passage connecting the trap chamber with the atmosphere, a water outlet for said trap chamber, a valve controlling the air passage and a valve controlling the water outlet connected together for simultaneous movement, a float in the chamber having an arm pivotally connected to the trap chamber and operatively connected with the water outlet and air valves, and means engaging the arm for retarding the movement of said arm, said means comprising a roller having a slidable bearing and a spring in engagement with the bearing for resisting movement of the bearing when said roller is engaged by the float arm.

In testimony, that I claim the foregoing as my own, I have hereto affixed my signature.

BERTRAM E. DOWNTON.